United States Patent [19]

Braun

[11] 4,197,231
[45] Apr. 8, 1980

[54] CORROSION RESISTANT COATING FROM WATER THINNABLE AMINOETHYLATED INTERPOLYMERS

[75] Inventor: Maurice A. Braun, Olivette, Mo.

[73] Assignee: Steelcote Manufacturing Company, St. Louis, Mo.

[21] Appl. No.: 907,683

[22] Filed: May 19, 1978

[51] Int. Cl.$^2$ ............................................. C08L 63/00
[52] U.S. Cl. ............................ 260/37 EP; 260/37 M; 260/42.22
[58] Field of Search .......... 260/29.6 H, 37 M, 37 EP, 260/42.22; 106/1.05, 1.25

[56] References Cited

U.S. PATENT DOCUMENTS

| | | | |
|---|---|---|---|
| 3,634,372 | 1/1972 | McFadden | 526/16 |
| 3,719,629 | 3/1973 | Martin et al. | 260/33.2 EP |
| 3,954,482 | 5/1976 | Novack | 260/37 M |

OTHER PUBLICATIONS

Dow Chemical Company; Dow Experimental Curing Agent XD-7080, A Revolutionary Approach to Water-Borne, Acrylic-Epoxy Coatings; 1977.
Young; Novel Ambient-Cured, Water-Borne, Acrylic-Epoxy Coatings; Journal of Coatings Technology; vol. 49, No. 632, Sep. 1977.

*Primary Examiner*—Lewis T. Jacobs
*Attorney, Agent, or Firm*—Glenn K. Robbins

[57] ABSTRACT

A water soluble coating composition having flash-rusting inhibiting qualities when used on ferrous metal surfaces and improved moisture resistance and film impermeability. The coating composition basically comprises a prior art water miscible solvent, and acidified aminoethylated vinyl polymer dissolved in the solvent and epoxy resin. To inhibit flash-rusting a rust inhibiting pigment selected from the group consisting of finely divided metallic alumimum or stainless steel is employed. The acidified aminoethylated vinyl polymer is one having pendant aminoethyl groups of the formula

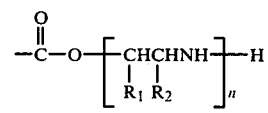

wherein $R_1$ and $R_2$ are independently selected from the group consisting of hydrogen and lower alkyl radicals of one to four carbon atoms and the average of n ranges from about 1.0 to about 2.5 and wherein the interpolymer before aminoethylation contains at least 3 percent by weight pendant —COOH groups and further wherein said aminoethyl groups are reacted with sufficient acid to impart water solubility to the interpolymer.

8 Claims, No Drawings

CORROSION RESISTANT COATING FROM WATER THINNABLE AMINOETHYLATED INTERPOLYMERS

BACKGROUND OF THE INVENTION

Water thinnable coating compositions have become of increasing importance in everyday life in various types of industrial applications because of ease in application and clean-up. Such water soluble compositions are increasingly desirable because of environmental considerations as a minimal amount of organic solvent is released to the atmosphere both in manufacture and use. Various types of aqueous coating systems have been used in the art and have greatly facilitated the application and clean-up and have obviated the use of turpentine or similar types of organic thinners.

Two component water dispersible coatings employing epoxy resins have been used in the art employing polyamide in a curing agent non-acid system. Such systems do not entail any significant problem of flash-rusting of ferrous metal substrates. There have been recently developed water base coatings exhibiting improved applications and film properties such as tack-free drying, better coating properties and color utilizing acidified aminoethylated interpolymer curing agents for epoxy resins. Such curing agents are described in R. T. McFadden U.S. Pat. No. 3,634,372 granted Jan. 11, 1972 and are further shown in water thinnable coating compositions using the curing agent in Martin et al U.S. Pat. No. 3,719,629 granted Mar. 6, 1973. Both patents are assigned to The Dow Chemical Company.

Such coating compositions employing the acidified aminoethylated interpolymer with an epoxy resin although exhibiting quite desirable film or coating characteristics show undersirable properties when used on steel substrates in the development of flash-rusting. This is believed to be because an acid is used to neutralize the aminoethylated interpolymer causing a bronze tone or flash-rusting to be developed when the coating is applied to the steel substrate. The discoloration or flash-rusting is unsightly and undesirable and shows through top coating with white pigments and other color.

SUMMARY OF THE INVENTION

By means of this invention there has been developed a flash-rust resistant water thinnable composition employing the acidified aminoethylated interpolymer curing agent used with an epoxy resin. The flash-rusting inhibition is obtained by the use of finely divided metallic pigment employing either aluminum or stainless steel. The coating film further has improved moisture resistance and film impermeability. This reduces dramatically the early formation of blisters with ultimate corrosion through film loss or failure when the blisters break open.

By the incorporation of the aluminum or stainless steel pigment in the epoxy resin phase or part two of the package this second part may be simply added to the first part containing the water phase with the acidified aminoethylated vinyl polymer to obtain a water base epoxy coating composition. The mixed composition can be simply used in the field with complete water clean-up capability. The two part package when stored separately has a stable shelf life and when mixed for use in the field has a good pot life of at least two hours up to eight hours or more.

The coating composition is relatively simple to prepare and provides a water thinnable coating which can be used on steel and other ferrous metal surfaces to inhibit flash-rusting and prevent discoloration caused thereby. It will be understood that the coating may use pigments with titanium dioxide as a white pigment or other pigments as desired. Additional top coatings employing the acidified aminoethylated vinyl polymer as a curing agent and the epoxy resin in the two package system may be employed using additional pigment as desired. The formulation further serves as a widely compatible primer for other generic top coats that may be either water base or water borne, solvent base or solvent containing formulations or solventless formulations. Thus the primer formulation of this invention having the afore-mentioned desirable properties is not limited in the type of top coat employed.

The above features are objects of this invention and further objects will appear in the detailed description which follows and will otherwise be apparent to those skilled in the art.

DESCRIPTION OF THE INVENTION

The acidified aminoethylated vinyl polymer employed in this invention is basically disclosed in the McFadden U.S. Pat. No. 3,634,372 granted Jan. 11, 1972. The formula of the acidified aminoethylated vinyl polymer has pendant aminoethyl groups of the formula

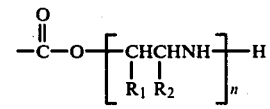

wherein $R_1$ and $R_2$ are independently selected from the group consisting of hydrogen and lower alkyl radicals of one to four carbon atoms and the average value of n ranges from about 1.0 to about 2.5 and the interpolymer before aminoethylation contains at least 3 percent by weight pendant —COOH groups and said aminoethyl groups are reacted with sufficient acid to impart water solubility. The curing agent system above described is sold commercially by the Dow Chemical as XD-7080.

The employment of this curing agent with an epoxy resin is well disclosed in the Martin et al U.S. Pat. No. 3,719,629 granted Mar. 6, 1973. As there disclosed the two part or two package system is employed to provide a water thinnable coating composition. In such compositions acidified aminoethylated vinyl polymer is used with water, a small amount of solvent and a defoamer in the first part. In the second part containing the epoxy resin a solvent, such as a glycol ether or the like, is used. The epoxy resin is used usually in a blend to provide flexibility and durability, toughness and adhesion characterisitics as desired. The epoxy resin, as it is commonly termed, is a diglycidyl ether of bisphenol or modifications as disclosed in the foregoing patents. Blends are conventionally used having different E.E.W. ie, epoxy equivalent weight as will be well understood in the art.

When using such formulations flash-rusting occurs on ferrous metal substrates such as steel or iron. By means of this invention it has been found that finely devided aluminum or stainless steel can be used as a flash-rust inhibiting agent in the second part or epoxy part of the aforementioned two part system. Such use of aluminum or stainless steel is provided in the two part package with good shelf life. Further, the pot life when the two parts are mixed is good and is from two to three hours up to eight hours or more enabling advantageous use in many industrial fields.

The flash-rusting occuring on ferrous metal when the acidified aminoethylated vinyl polymer curing agent is used in the water system with the epoxy resin without the inhibiting agents of this inventions is well known. It is theorized that the epoxy resin will discolor the ferrous metal substrate because an acid is used to neutralize the amine in the aminoethylated vinyl polymer curing agent. The flash-rusting or bronze color may be created by the formation of some type of iron-amino acid chelate which lifts into film but does not affect adhesion.

Regardless of the theoretical chemical phenomena involved, applicant does not wish to be bound by such theorizing. Applicant has found that flash-rusting using the acidified aminoethylated vinyl polymer curing agent and epoxy resin after testing various additivies can be inhibited, masked or otherwise caused not to be apparent by employing finely divided aluminum or stainless steel. Further, and quite importantly this result can be obtained with good shelf life stability in the two part package and a good pot life when the two parts are mixed enabling the composition to be employed with the advantages of water clean-up in a wide spread use of applications. Further, such use releases a minimal amount of organic solvent vapors to the atmosphere and meets environmental objections to such organic solvent pollution problems.

Various tests have been employed to determine the flash-rust inhibiting quality of various additives when employed with the acidified aminoethylated vinyl polymer used as a curing agent in the water based solvent system with epoxy resin. Such tests have been employed with potential flash-rust additives in the curing agent and epoxy resin system disclosed in Example 1, as substitutes for the aluminum pigment of that example. Tests using different additives are as follows:

1. Molywhite 101 (Basic Zinc Molybdate) in conjunction with 20% Phosphoric Acid. This resulted in no flash-rusting, but a gummy hard sediment formed within 3–4 days. The additives of basic zinc molybdate and 20% phosphoric acid was employed in part 1, as in all of the succeeding water based formulations as the additive would not mix in part 2.
2. Calcium Molybdate with 20% Phosphoric Acid. This combination was tried in various proportions and under various conditions. There was no flash-rusting, but in each case there was a hard sediment formed in 3-4 days.
3. Molywhite 212 (Basic Calcium Zinc Molybdate) with 20% Phosphoric Acid also showed no flash-rusting, but it bodied badly and settled hard in a few days.
4. Busan 11-M-1 (Barium Metaborate) is unworkable. It is highly alkaline (pH 10.0–10.5) and bodies up badly with the acid DER XD 7080. The acid DER XD 7080 is the acidified aminoethylated vinyl polymer obtained from The Dow Chemical Co.
5. Ammonium Molybdate. This compound is less effective than the calcium compound in preventing flash-rusting. It also settles hard in a short time.
6. Colemanite Blend (Calcium Boron Silicate)+20% Phosphoric acid is effective in preventing flash-rusting, but settles hard in 5 days. The settling in 5 days make this composition unacceptable commercially as the shelf life needs to be at least one year to 18 months.
7. Halox CW-111 (Calcium phospho silicate)+20% phosphoric acid does not prevent flash-rusting and causes heavy bodying. The heavy bodying makes this composition unacceptable because of shelf life and mixing considerations.
8. Halox CW-22 (Calcium Boro Silicate)+20% phosphoric acid in various proportions show some flash-rusting and bodying. Sediment is also formed but at a slower rate.

On aging of 4–5 weeks most of the additives except calcium molybdate lose their effectiveness in preventing flash-rusting. All of the additives show unsatisfactory settling. The use of a surfactant was unsuccessful in preventing such settling.

Besides the additives listed above, applicant has tested additional potential rust inhibiting additives in the acidified aminoethylated vinyl polymer curing agent and epoxy resin coating system such as zinc and lead powders. The zinc additive was unsuccessful as it enters into reaction in mixing Parts I and II and there was no pot life. Lead as an additive was tired and a mottling discoloration was produced indicating flash-rusting. Alkaline additives are known to make the coating system unuseable.

There is set forth below in Example 1, a formulation using the acidified aminoethylated vinyl polymer curing agent with epoxy resin using finely divided aluminum that applicant found inhibits flash-rusting on steel surfaces.

EXAMPLE 1

The following primer coating was formulated using aluminum pigment in a two part composition.

| PART I | |
|---|---|
| | Weight % |
| Acidified aminoethylated vinyl polymer | 31.82 |
| Bisphenol A | .64 |
| Aluminum Silicate | 6.42 |
| Defoamer | .39 |
| Petroleum distillate | 5.15 |
| Water at pH 7.0–7.5 | 55.58 |
| | 100.00 |

| PART II | |
|---|---|
| | Weight % |
| Diglycidyl ether of bisphenol A (E.E.W. = 186–192) | 31.96 |
| Digycidyl ether of bisphenol A (E.E.W. = 305–335) | 5.84 |
| Non-leafing aluminum paste | 51.55 |
| Glycol ethyl ether | 10.65 |
| | 100.00 |

After formulation Parts I and II are added together in the ratio of 779.3 parts by weight of Part I to 291 parts by weight of Part II. Both Parts I and II when stored separately have a good shelf life and when mixed have a pot life of a minimum of two to three hours up to eight hours or more enabling the coating formulation to be used for general industrial applications.

In the formulation of Example 1, the acidified aminoethylated vinyl polymer used was that sold by Dow Chemical Company as XD-7080. The diglycidyl ether of bisphenol A having an E.E.W. ie, epoxy equivalent weight of 186–192 was Dow DER 331 although Celanese Resins 510 and others could be employed having a comparable E.E.W. The diglycidyl ether of bisphenol A having an E.E.W. of 305–335 was Celanese Resins Epi-Rez 502 although other epoxy resins such as Dow 732 and others having a comparable E.E.W. can likewise be employed. The non-leafing aluminum paste was Reynolds Aluminum passing 325 mesh (44 micron) screen and the percent of aluminum by weight was 66%. The aluminum is used in Part II as is does not mix well in Part I and causes gassing. When used commercially the aluminum paste should desirably provide an aluminum content of about 1.3 to 1.5 pounds per gallon. Applicant has found that good results can be obtained using 1 pound per gallon although not as good as at the higher amount. While it is possible to use as much as 2.5 pounds per gallon this has no increased advantage over the lower content with regard to inhibition of flash-rusting. The bisphenol A added to Part I is not required to be used but is desirable since it increases the body and viscosity. The aluminum silicate is an inert agent used as a filler and bodying agent.

EXAMPLE 2

This example illustrates the incorporation of stainless steel pigment in a two part composition.

| PART I | |
|---|---|
| | Weight % |
| Acidified aminoethylated vinyl polymer | 31.82 |
| Bisphenol A | .64 |
| Aluminum Silicate | 6.42 |
| Defoamer | .39 |
| Petroleum distillate | 5.15 |
| Water at pH 7.0–7.5 | 55.58 |
| | 100.00 |

| PART II | |
|---|---|
| | Weight % |
| Diglycidyl ether of bisphenol A (E.E.W. = 186–192) | 38.59 |
| Diglycidyl ether of bisphenol A (E.E.W. = 305.-335) | 7.05 |
| Stainless steel flake | 41.50 |
| Glycol ethyl ether | 12.86 |
| | 100.00 |

In the formulation of Example 2, the various components are basically the same as in Example 1, except that stainless steel flake has been substituted in Part II for aluminum. The stainless steel employed was 18-8 and particle size 325 mesh. In Example 2, the finished formulation is provided by adding 779.3 parts by weight of Part I to 241 parts by weight of Part II just as in Example 1. The formulation when mixed has a pot life similar to that of Example 1. The stainless steel has been found to act in much the same manner as aluminum with regard to inhibition of flash-rusting and is used in a similar manner.

Various experiments using different paints to determine comparative flash-rusting effect on ferrous metal substrates have been carried out. Such tests comprised painting steel strips with various different solvent systems and curing agents including organic solvent bases, non-acid water base and acidified aminoethylated vinyl polymer water base formulations. The latter formulation in some of the acidified aminoethylated vinyl polymer systems used the following epoxy white paint or coating of Example 3, as a top coat.

EXAMPLE 3

This formulation is basically the same as Example 1 and 2, neither aluminum nor stainless steel pigment is employed. Titanium dioxide as a white pigment is added in Part 1.

| PART I | |
|---|---|
| | Weight % |
| Acidified aminoethylated vinyl polymer | 23.52 |
| Bisphenol A | .47 |
| Titanium dioxide | 30.85 |
| Defoamer | .27 |
| Petroleum distillate | 3.80 |
| Water at pH 7.0–7.5 | 41.07 |
| Blue Tint | .02 |
| | 100.00 |

| PART II | |
|---|---|
| Diglycidyl ether of bisphenol A (E.E.W. = 186–192) | 71.53 |
| Diglycidyl ether of bisphenol A (E.E.W. = 305–335) | 13.07 |
| Glycol ethyl ether | 15.40 |
| | 100.00 |

The formulation to provide a white top coat was prepared by adding together 100 parts by weight of Part I and 12.3 parts of Part II.

In these experiments various coating systems were exposed to salt spray in a salt spray machine containing 5% solution using the procedure under ASTM designation B117-64 except that the tests were run at room temperature rather than 95° F. as no heating element was available.

The following coating systems were exposed to the salt spray in these tests:

System 1

Zinc Primer—1 coat
Finish coat—1 coat

System 1, used an aromatic petroleum distillate solvent base with xylene and butyl alcohol. System 1, is a commercial solvent base preparation using zinc as a corrosion inhibitor in the primer and an epoxy resin in both the primer and the finish coat that is simply used for basis of comparison against different systems.

System 2

Primer—2 coats
Finish coat—1 coat

System 2, employed a solvent of a petroleum distillate. The primer coat used non-leafing aluminum while the finish coat used a leafing aluminum. The resin is conventional moisture cured urethane as distinct from the epoxy resin in System 1. This system likewise is used for comparison.

System 3

Primer—1 coat
Finish coat—1 coat

System 3, used basically the same vehicle and resin as System 2, with the pigment being stainless steel rather than aluminum.

System 4

Aluminum Primer—1 coat
Finish coat—1 coat

System 4, used the coating composition of this invention described in Example No. 1, using aluminum as a flash-rust inhibiting pigment in the primer. The top or finish coat was Example 3.

System 5

Primer—1 coat
Finish coat—1 coat

System 5, uses a water based epoxy in both the primer and top coat. The curing agent in the primer is a polyamide which is non-acid made by General Mills while the top coat is Example 3.

System 6

Primer—1 coat
1st finich coat—1 coat
2nd finish coat—1 coat

System 6, uses a silicate water base vehicle in the primer. In the second coat the polyamide curing agent of General Mills as above described was employed. The polyamide curing agent has a high amine value having a greater chemical resistance. The epoxy portion is a blend of two epoxy resins one of which has a relatively low E.E.W. In the third coat, an acrylic urethane was employed as the resin in a solvent base employing glycol monoethyl ether acetate.

System 7

Primer—1 coat
Finish coat—1 coat

The primer uses a moisture cured urethane as above described with the employment of stainless steel as a pigment. The top coat employing the urethane is the same as that employed as a third coat in System 6.

System 8

Primer—1 coat
Finish coat—2 coats

The primer uses a moisture cured urethane as previously employed with stanless steel as a pigment. The finish coats were vinyl with a solvent base primarily methyl ethyl ketone and xylene.

In Systems 2 and 6 the coatings were employed on 1 by 6 inch sand blasted steel panels. The remainder of the panels were rusty steel 3 by 5 inches which were wire brushed. The panels were solvent washed. The total dry mil thickness of both primer and finished coats varied from 5 to 8 mils except for panel No. 5 which was 10 mil. The panels were coated on the reverse side with a heavy bodied moisture cured urethane paint containing aluminum for protection against corrosion.

After seven days cure all panels were hung in the salt spray machine containing 5% salt solution running at room temperature. The bottom third of the panels were scored, that is the film was cut through to the bare metal before exposure.

Within five days all panels except System No. 1, showed some rust on the scored line to a varying extent. System No. 1, did not show any rust until 14 days had passed. System No. 5, was the worst showing blisters in addition to the rust in the scored area in 9 days. System No. 3, and No. 7, developed blisters in the scored area in 14 days.

Following are the results of six weeks or 1000 hours exposure in salt spray:

1. Extensive rust in scored area; a few rust spots on edges. No blisters.
2. ¾ of the scored lines show rust. Faint beginnings of a few blisters.
3. Rust in scored area and along edges. Medium and large blisters, mostly in the scored area.
4. Extensive rust in scored area; no blisters.
5. Extensive rust in scored area and at edges. Many blisters all over panel. The blisters go to the bare metal, and there is no rust under them. Exposure for this panel was discontinued.
6. Extensive rust in scored area. Six small and medium blisters over the rest of the panel.
7. Extensive rust in scored areas. Many small and medium sized blisters in scored area.
8. Extensive rust in scored areas. Quite a few medium size and large blisters in scored area.

The panels were viewed again after 1100 hours. The blisters on No. 6, were seen to go to the bare metal. Exposure was terminated. No. 3, also was taken out because the blisters were cut into. This panel showed poor adhesion at the point of incision. About two inches of film could be lifted off.

In the foregoing tests of System 4, using the flash-rust inhibiting aluminum pigment as illustrated in Example 1, it can be seen that the system compared favorably with solvent base systems and out performed other water base systems. No flash-rusting or blisters appeared and the formulation of this invention demonstrates its suitability in comparison with other types of systems.

The previous examples and tests have shown the ease in formulation and efficiency of the flash-rust inhibiting composition of this invention using finely divided aluminum or stainless steel with the acidified aminoethylated vinyl polymer water base curing agent.

The improved properties of flash-rust inhibition, moisture resistance and film impermeability represent a substantial improvement in the art and advance the potential of use in wider fields for the coating formulation provided by this invention.

The two part package using epoxy resins can be used on various ferrous metal surfaces for general industrial application without flash-rusting in packages that have good shelf life and pot life after mixing. The flash-rust inhibiting improvement made possible by this invention extends the applicability of the acidified aminoethylated vinyl polymer curing agent system with all the benefits obtainable thereby in improvements in film properties, water clean-up and substantial elimination of solvent vapor release to the atmosphere.

Various changes and modifications may be made within this invention as will be readily understood in the art. Thus changes in the proportion of the components, employment of solvents and blends of epoxy resins are well within the skill of the chemical formulator. Such modifications and changes are within the scope and teaching of this invention as defined by the claims appended hereto.

What is claimed is:

1. A water thinnable coating composition having flash-rusting inhibiting qualities when used on ferrous metal surfaces comprising (1) a water miscible solvent, (2) an acidified aminoethylated vinyl polymer dissolved in said solvent, said interpolymer having pendant aminoethyl groups and wherein said aminoethyl groups are reacted with sufficient acid to impart water solubility to said interpolymer, (3) a rust inhibiting pigment selected from the groups consisting of finely divided metallic aluminum and stainless steel and (4) an epoxy resin.

2. The composition of claim 1, in which the pigment is aluminum.

3. The composition of claim 1 in which the pigment is stainless steel.

4. The composition of claim 1, in which the composition has a stable shelf life and a pot life of at least 2 hours.

5. The composition of claim 1, in which the composition is formed by combining a first part with a second part, said first part comprising (1) a water miscible solvent, (2) an acidified aminoethylated vinyl polymer dissolvend in said solvent, said interpolymer having pendant aminoethyl groups and further wherein said aminoethyl groups are reacted with sufficient acid to impart water solubility to said interpolymer and said second part comprising an epoxy resin and a rust inhibiting pigment selected from the group consisting of finely divided metallic aluminum and stainless steel.

6. A rust inhibiting coated ferrous metal surface composition comprising a ferrous metal substrate and a rust inhibiting coating resulting from coating the ferrous metal surface with a water thinnable coating composition having flash-rust inhibiting qualities when used on ferrous metal surfaces comprising (1) a water miscible solvent, (2) an acidified aminoethylated vinyl polymer dissolved in said solvent, said interpolymer having pendant aminoethyl groups and further wherein said aminoethyl groups are reacted with sufficient acid to impart water solubility to said interpolymer, (3) a rust inhibiting pigment selected from the groups consisting of finely divided metallic aluminum and stainless steel and (4) an epoxy resin.

7. The composition of claim 6, in which the pigment is aluminum.

8. The composition of claim 6, in which the pigment is stainless steel.